(No Model.)

C. PULLAR.
AXLE BOX.

No. 509,584. Patented Nov. 28, 1893.

Witnesses
Chas. B. Chandler
G. B. Jenkins.

Inventor
Charles Pullar.
by Chas. L. Burdett
Attorney.

UNITED STATES PATENT OFFICE.

CHARLES PULLAR, OF HARTFORD, CONNECTICUT.

AXLE-BOX.

SPECIFICATION forming part of Letters Patent No. 509,584, dated November 28, 1893.

Application filed March 3, 1892. Serial No. 423,593. (No model.)

*To all whom it may concern:*

Be it known that I, CHARLES PULLAR, of Hartford, Connecticut, have invented certain new and useful Improvements in Axle-Boxes, of which the following is a specification.

The invention relates to the class of axle boxes for wheels, provided with means for holding the lubricating material, the object being to so construct such a box that the most desirable materials can be stored in a simple manner in the interior, so as to thoroughly and economically lubricate the axle when it is being run; and to this end the invention resides in an axle box provided with interior grooves of peculiar construction and arrangement.

Figure 1:
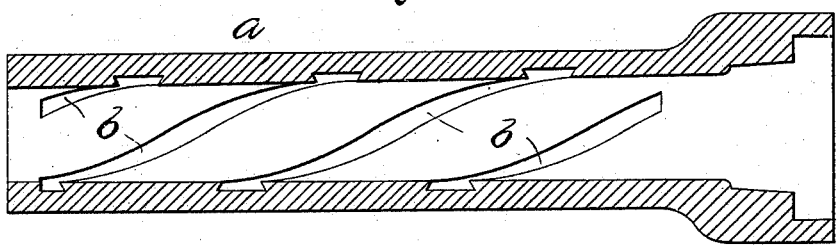
Figure 2:
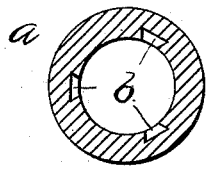

Referring to the drawings: Figure 1 is a longitudinal section of the improved box; and Fig. 2 is a transverse section of the same.

In the views A indicates an axle box preferably of cast metal, the uniform interior diameter of which is provided with spiral grooves $b$ that are cut or cast a slight distance into the walls of the box. These grooves, which do not extend quite from end to end of the box, and which are of the same dimensions throughout are dovetail-shape in cross-section, that is, they are narrower at the surface than at the bottom, so that when the axle is in place they form closed dovetail spiral chambers. The lubricating material is placed in these grooves before the box is put upon the axle. The object of this peculiar dovetail shape in cross-section of the grooves, that is, having them narrower at the surface, is to allow stiff grease, which is the best and most economical lubricant, to be filled into the grooves before the axle is put in place, and there held until it is softened by the heat produced by the axle when the vehicle is used. If these grooves are not dovetailed, that is narrower at the surface than below, the lubricating material would drop or run out before the axle could be placed in the box. If desired, these peculiar shaped grooves may be packed with an absorbent material, as wicking or felt, which may be soaked with a lubricating material. And where this is done, it is obvious that as the grooves are wider at their bottom that at the mouth, the friction of the wicking against the axle when the wheel is in rotation tends to thrust the absorbent material into the larger part of the grooves where it will stay compressed so as to give up a portion of the lubricating substance and cause the wheel to run freely. With grooves of this kind the wicking does not work out of place by rubbing against the surface of the axle, as it does where the grooves are smaller at the bottom than at the mouth. The spiral form of groove is of advantage, in that, whatever position the box may be in, a portion of one of the grooves will always be uppermost.

As the grooves do not extend to the ends, or have any passage through the sides of the box when the axle is in place, closed chambers are formed so that there can be no possible way for the grease or oil to escape and run out over the wheel, or dry up.

The device is simple and cheap in construction; it is effective and economical in use; and it is durable and lasting.

I claim as my invention—

A rotary axle box of uniform interior diameter having in its inside face a series of distinct spiral grooves of dove-tail cross section that end short of the ends of the box, and form chambers for holding the lubricating material, said grooves being of the same dimensions throughout, substantially as herein described.

CHARLES PULLAR.

Witnesses:
A. B. JENKINS,
THOMAS F. FOLEY.